US006830204B1

United States Patent
Morey

(10) Patent No.: US 6,830,204 B1
(45) Date of Patent: Dec. 14, 2004

(54) REVERSING AUTOMATIC FEED WHEEL ASSEMBLY FOR WOOD CHIPPER

(75) Inventor: Thomas J. Morey, Riverdale, MI (US)

(73) Assignee: Tramor, Inc., Remus, MI (US)

( * ) Notice: Subject to any disclaimer, the term of this patent is extended or adjusted under 35 U.S.C. 154(b) by 0 days.

(21) Appl. No.: 10/013,570

(22) Filed: Dec. 10, 2001

(51) Int. Cl.$^7$ .............................................. B02C 25/00
(52) U.S. Cl. ........................................... 241/34; 241/92
(58) Field of Search ................................ 241/92, 101.3, 241/34, 36, 37.5

(56) References Cited

U.S. PATENT DOCUMENTS

| | | |
|---|---|---|
| 3,069,101 A | 12/1962 | Wexell |
| 3,076,489 A | 2/1963 | Schmidt et al. |
| 3,182,917 A | 5/1965 | Tamny et al. |
| 3,276,700 A | 10/1966 | Eklund |
| 3,463,405 A | 8/1969 | Shepherd |
| 3,559,724 A | 2/1971 | Wilkinson |
| 3,635,410 A | 1/1972 | Smith |
| 3,868,062 A | 2/1975 | Cunningham et al. |
| 3,939,886 A | 2/1976 | Tucek |
| 3,989,198 A | 11/1976 | Blasko |
| 4,022,021 A | 5/1977 | Russell, Jr. |
| 4,260,114 A | 4/1981 | Herder |
| 4,452,400 A | 6/1984 | Williams |
| 4,560,110 A | 12/1985 | Burda |
| 4,598,745 A | 7/1986 | Parviainen |
| 4,685,624 A | 8/1987 | Nidiffer et al. |
| 4,687,179 A | 8/1987 | Smith |
| 4,692,028 A | 9/1987 | Schave |
| 4,716,823 A | 1/1988 | Capdevila |
| 4,721,257 A | 1/1988 | Williams et al. |
| 4,793,561 A | 12/1988 | Burda |
| 4,796,819 A | 1/1989 | Waterman |
| 4,906,486 A | 3/1990 | Young |
| 5,005,620 A | 4/1991 | Morey |
| 5,018,672 A | 5/1991 | Peck et al. |
| 5,088,532 A | 2/1992 | Eggers et al. |
| RE33,840 E | 3/1992 | Peterson et al. |
| 5,167,374 A | 12/1992 | Strohmeyer |
| 5,263,651 A | 11/1993 | Nadarajah |
| 5,358,189 A | 10/1994 | Vandermolen |
| 5,362,004 A | 11/1994 | Bateman |
| 5,372,316 A | 12/1994 | Bateman |
| 5,413,286 A | 5/1995 | Bateman |
| 5,667,152 A | 9/1997 | Mooring |
| 5,988,539 A | 11/1999 | Morey |
| 6,000,642 A | 12/1999 | Morey |
| 6,016,855 A | 1/2000 | Morey |
| 6,032,707 A | 3/2000 | Morey et al. |
| 6,293,479 B1 | 9/2001 | Kaczmarski et al. |
| 2002/0070301 A1 | 6/2002 | Stelter et al. |

FOREIGN PATENT DOCUMENTS

| | | |
|---|---|---|
| DE | 36 24 996 A1 | 2/1988 |
| DE | 38 08 487 C1 | 5/1989 |

OTHER PUBLICATIONS

"Power–fed Mobile Wood Shippers—Operator Protection at Infeed Chutes", Health & Safety Executive, Agriculture Information Sheet No. 38, Sep. 2000.

*Primary Examiner*—Mark Rosenbaum
(74) *Attorney, Agent, or Firm*—Bliss McGlynn, P.C.

(57) ABSTRACT

A reversing automatic feed wheel assembly for wood chipper includes an infeed assembly and a rotatable cutting assembly spaced from the infeed assembly. The reversing automatic feed wheel assembly also includes at least one feed wheel disposed between the infeed assembly and the cutting assembly to feed wood material to the cutting assembly. The reversing automatic feed wheel assembly further includes a control system operatively connected to the at least one feed wheel to automatically reverse/stop/restart the infeed of the wood material in response to a reduced speed or excessive load placed on the cutting assembly.

18 Claims, 3 Drawing Sheets

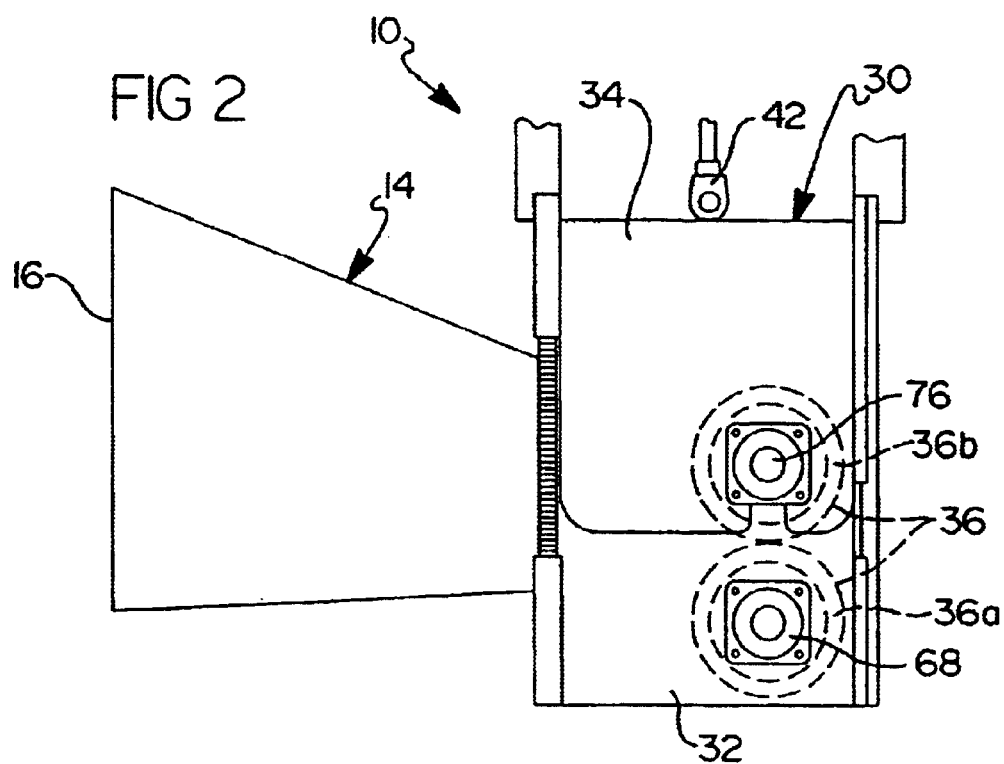
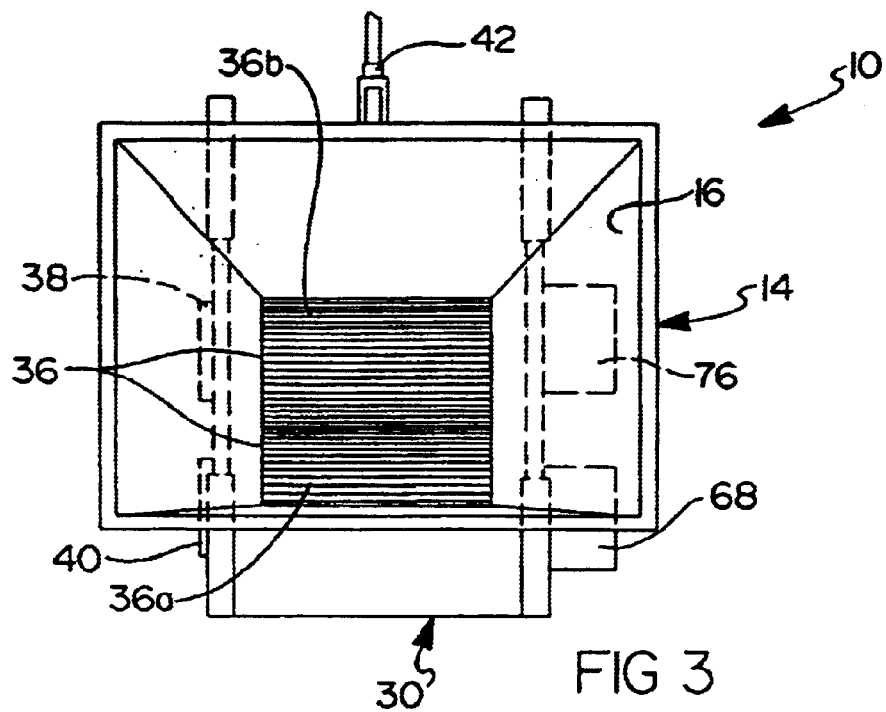

REVERSING AUTOMATIC FEED WHEEL ASSEMBLY FOR WOOD CHIPPER

BACKGROUND OF THE INVENTION

1. Field of the Invention

The present invention relates generally to wood chippers and, more particularly, to a reversing automatic feed wheel assembly for a wood chipper.

2. Description of the Related Art

It is known to provide a wood chipper for chipping wood such as brush, branches, and the like to produce wood chips. An example of such a wood chipper is disclosed in U.S. Pat. No. 5,988,539 to Morey. In this patent, the wood chipper includes an infeed assembly, feed wheel assembly, and a cutting assembly having a rotatable disc with at least one knife or blade for chipping the wood entering the wood chipper and reducing it to wood chips. Typically, the feed wheel assembly includes a stationary lower feed wheel connected to a lower housing and a movable upper feed wheel connected to an upper housing movable relative to the lower housing for allowing wood to enter the cutting assembly. The wood chipper also includes an engine connected to a hydraulic pump, which pumps fluid to drive hydraulic motors to rotate the feed wheels.

Although this type of feed wheel assembly has worked well, it suffers from the disadvantage of stalling the engine of the wood chipper when an excessive load is placed on the cutting assembly by the wood material fed to the cutting assembly by the feed wheel assembly. When the engine stalls, the wood chipper is plugged. As a result, the wood chipper has to be unplugged, the engine restarted, and wood material refed to the feed wheel assembly. This is relatively time consuming and labor intensive, resulting in higher costs, which is undesired. Therefore, there is a need in the art to provide a reversing automatic feed wheel assembly for a wood chipper that overcomes the above disadvantages.

SUMMARY OF THE INVENTION

Accordingly, the present invention is a reversing automatic wheel feed wheel assembly for a wood chipper including an infeed assembly and a rotatable cutting assembly spaced from the infeed assembly. The reversing automatic feed wheel assembly also includes at least one feed wheel disposed between the infeed assembly and the cutting assembly to feed wood material to the cutting assembly. The reversing automatic feed wheel assembly further includes a control system operatively connected to the at least one feed wheel to automatically reverse the infeed of the wood material in response to a reduced speed or excessive load placed on the cutting assembly/engine power source.

One advantage of the present invention is that a reversing automatic feed wheel assembly is provided for a wood chipper. Another advantage of the present invention is that the reversing automatic feed wheel assembly stops, reverses, and then restarts the feed wheel assembly. A further advantage of the present invention is that the reversing automatic feed wheel assembly includes a control system that can be used with a feed wheel assembly that is powered hydraulically, electronically, or pneumatically.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 2 is a side elevational view of the reversing automatic feed wheel assembly of FIG. 1.

FIG. 3 is a front elevational view of the reversing automatic feed wheel assembly of FIG. 1.

DESCRIPTION OF THE PREFERRED EMBODIMENT(S)

Figure 1:
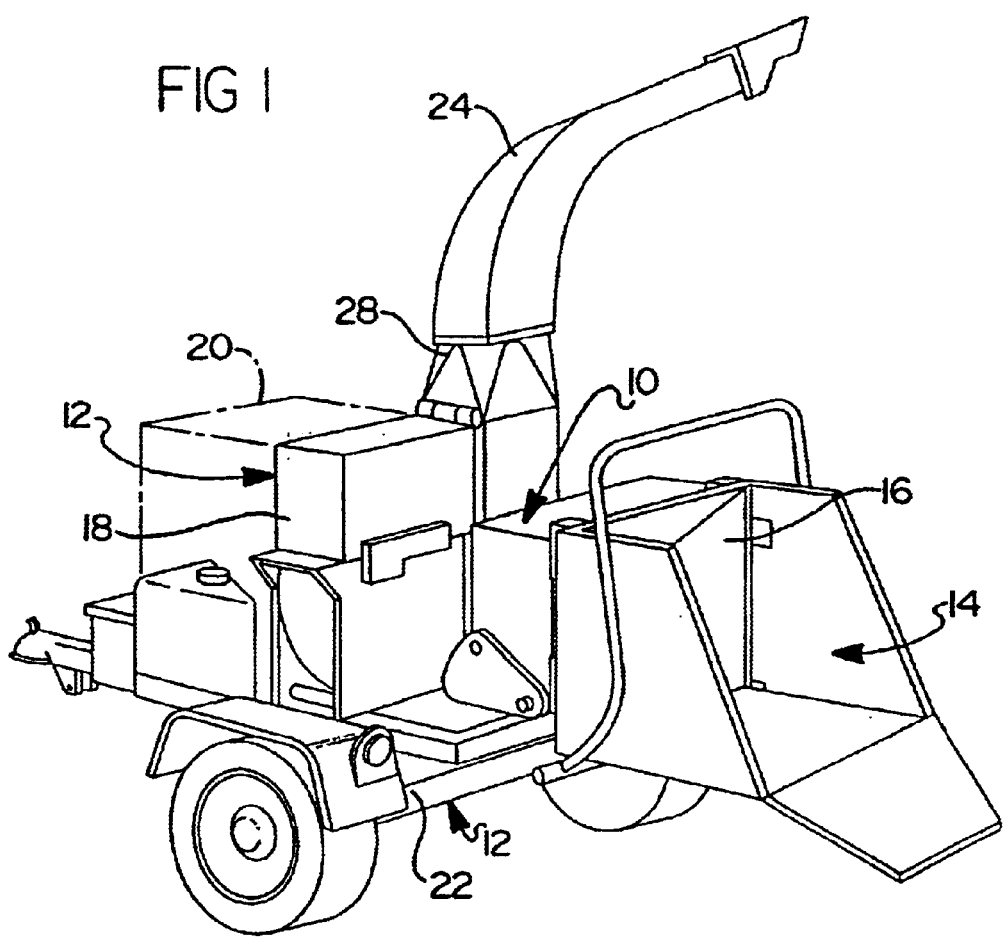
FIG. 1 is a perspective view of a reversing automatic feed wheel assembly, according to the present invention, illustrated in operational relationship with a wood chipper.

Referring now to the drawings and in particular FIGS. 1 through 3, one embodiment of a reversing automatic feed wheel assembly 10, according to the present invention, is shown for a 5 wood chipper, generally indicated at 12. The wood chipper 12 includes an infeed assembly 14 having an inlet 16 to allow wood material to enter the wood chipper 12. The wood chipper 12 also includes the reversing automatic feed wheel assembly 10 disposed between and adjacent to the infeed assembly 14. The wood chipper 12 further includes a cutting assembly 18 for rotation about a horizontal axis adjacent to the reversing automatic feed wheel assembly 10. The reversing automatic feed wheel assembly 10 is used for pulling and pushing the wood material from the infeed assembly 14 to the cutting assembly 18. The cutting assembly 18 includes a rotatable disc or drum (not shown) having a plurality of blades (not shown) operatively connected to the disc/drum for chipping the wood material. It should be appreciated that, except for the reversing automatic feed wheel assembly 10, the wood chipper 12 is conventional and known in the art.

The wood chipper 12 includes an engine 20 mounted on a frame 22 and operatively coupled to the reversing automatic feed wheel assembly 10 and cutting assembly 18 to cause rotation of the feed wheels 36 to be described and the rotatable disc/drum. The wood chipper 12 includes a rotatable shaft (not shown) operatively connected to the disc/drum of the cutting assembly 18 and a pulley (not shown) disposed about one end of the shaft. The wood chipper 12 also includes a rotatable shaft (not shown) operatively connected to the engine and a pulley (not shown) disposed about the shaft (not shown). The wood chipper 12 further includes a belt or belts (not shown) disposed over and interconnecting the pulleys. It should be appreciated that the engine rotates the cutting assembly 18 and a hydraulic pump 58 to be described to pump hydraulic fluid to rotate feed wheels 36 to be described of the reversing automatic feed wheel assembly 10.

The wood chipper 12 includes an outlet or discharge chute 24 operatively connected to the cutting assembly 18.

The discharge chute 24 is generally tubular and may be circular or rectangular in cross-sectional shape. The discharge chute 24 may extend upwardly and away. It should be appreciated that the discharge chute 24 may have any suitable cross-sectional shape.

Referring to FIGS. 1 through 3, the reversing automatic feed wheel assembly 10 includes a housing, generally indicated at 30. The housing 30 includes a first or lower housing 32 having a generally rectangular shape. The lower housing 32 is stationary and connected to the frame 22 by suitable means such as welding. The lower housing 32 has an inlet (not shown) on one side to receive wood material from the infeed assembly 14 and an outlet (not shown) on the other side to discharge wood material to the cutting assembly 18. It should also be appreciated that the lower housing 32 may have any suitable cross-sectional shape.

The housing 30 also includes a movable second or upper housing 34 disposed over the lower housing 32 and slidable relative to the lower housing 32. The upper housing 34 is generally rectangular in shape with a generally inverted U shape cross-section to enclose or cover the lower housing 32. The upper housing 34 has an inlet (not shown) on one side to receive wood material from the infeed assembly 14 and an outlet (not shown) on the other side to discharge wood material to the cutting assembly 18. It should be appreciated that the upper housing 34 may have any suitable cross-sectional shape.

The reversing automatic feed wheel assembly 10 also includes at least one, preferably a multiple or plurality of rotatable feed wheels 36 disposed in the housing 30. In a preferred embodiment, the feed wheels 36 are two feed wheels 36a, 36b. Preferably, the feed wheels 36a, 36b are orientated horizontally to rotate about a horizontal axis. The feed wheel 36a is a lower feed wheel, which is supported by the lower housing 32. The feed wheel 36b is an upper feed wheel, which is supported by the upper housing 34. The lower feed wheel 32a and upper feed wheel 32b form a pair of the feed wheels 36 and the upper feed wheel 36b is spaced vertically from the lower feed wheel 36a. The lower feed wheel 36a is rotatably supported on the lower housing 32 by a pair of opposed bearings 38. The bearings 38 are secured to the lower housing 32 by suitable means such as fasteners (not shown). It should be appreciated that the lower feed wheel 36a is disposed within the lower housing 32 and supported by the bearings 38 to rotate relative to the housing 30.

The upper feed wheel 36b is rotatably supported on the upper housing 34 by a pair of opposed bearings 40. The bearings 40 are secured to the upper housing 34 by suitable means such as fasteners (not shown). It should be appreciated that the upper feed wheel 36b is disposed within the upper housing 34 and supported by the bearings 40 to rotate relative to the housing 30. It should also be appreciated that the feed wheels 36a and 36b are operatively connected to the engine 20 of the wood chipper 12 by suitable means such as the hydraulic pump 58 which pumps fluid to drive hydraulic motors 68,76 to be described to rotate the feed wheels 36a and 36b. It should be appreciated that the wood chipper 12 may have a hydraulic cylinder 42 connected to the hydraulic pump 58 and the upper housing 34 to allow an operator to slidably raise and lower the upper housing 34 relative to the lower housing 32. It should also be appreciated that, in other embodiments, the feed wheels 36 may be located horizontally, vertically, or diagonally for the reversing automatic feed wheel assembly 10. It should be further appreciated that one of the feed wheels 36 may be a conveyor (not shown) to infeed wood material to the cutting assembly 18.

Figure 4:
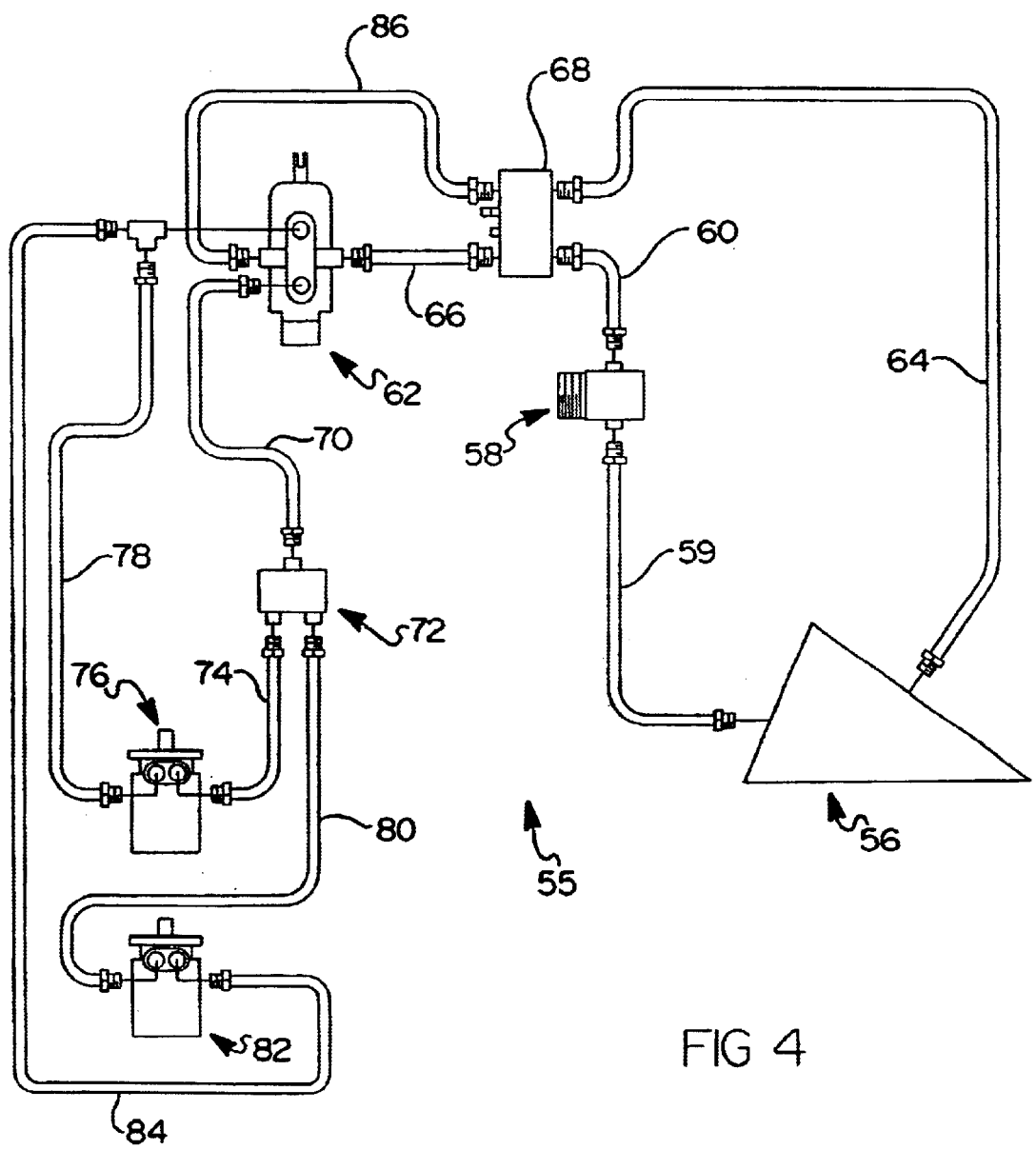
FIG. 4 is a schematic view of a control system of the reversing automatic feed wheel assembly of FIG. 1.

Referring to FIGS. 3 and 4, the reversing automatic feed wheel assembly 10 includes a control system, generally indicated at 55, to control the rotation of the feed wheels 36. The control system 55 includes a storage tank 56 containing hydraulic fluid having an inlet port and an outlet port thereon. The outlet port of the storage tank 56 is connected to an inlet port of a hydraulic pump 58 by a feed line 59. An outlet port of the hydraulic pump 58 is connected to a fluid supply line 60. It should be appreciated that a pressure relief mechanism (not shown) can be disposed along the fluid supply line 60 as needed.

The control system 55 includes the fluid supply line 60 connected to the hydraulic pump 58 and a reversing auto feed block 68 connected to the fluid supply line 60. The control system 55 also includes a fluid return line 64 connected to the reversing auto feed block 68 and the storage tank 56. The control system 55 includes a fluid line 66 connected to the auto reversing feed block 68 and a feed or control valve 62 connected to the feed line 66. The control system 55 further includes a fluid line 70 connected to the feed valve 62 and a flow divider 72 connected to the fluid line 70. The control system 55 includes a feed line 74 connected to the flow divider 72 and a top feed wheel motor 76 connected to the feed line 74 and a return line 78 connected to the top feed wheel motor 76 and the feed valve 62. The control system 55 also includes a feed line 80 connected to the flow divider 72 and a bottom feed wheel motor 82 connected to the feed line 80 and a return line 84 connected to the bottom feed wheel motor 82 and the feed valve 62. The control system 55 includes a return line 86 connected to the auto feed block 68 and the feed valve 62. It should be appreciated that pressurized fluid from the hydraulic pump 58 flows through the supply lines 60,66,70, 74,80 to the motors 76,82, and return to the storage tank 56 through the return lines 64,78,84,86. It also should be appreciated that the flow divider 72 divides the fluid flow between lines 74 and 80. It should further be appreciated that the feed valve 62 receives fluid from supply line 66 and returns fluid to return line 86.

Figure 5:
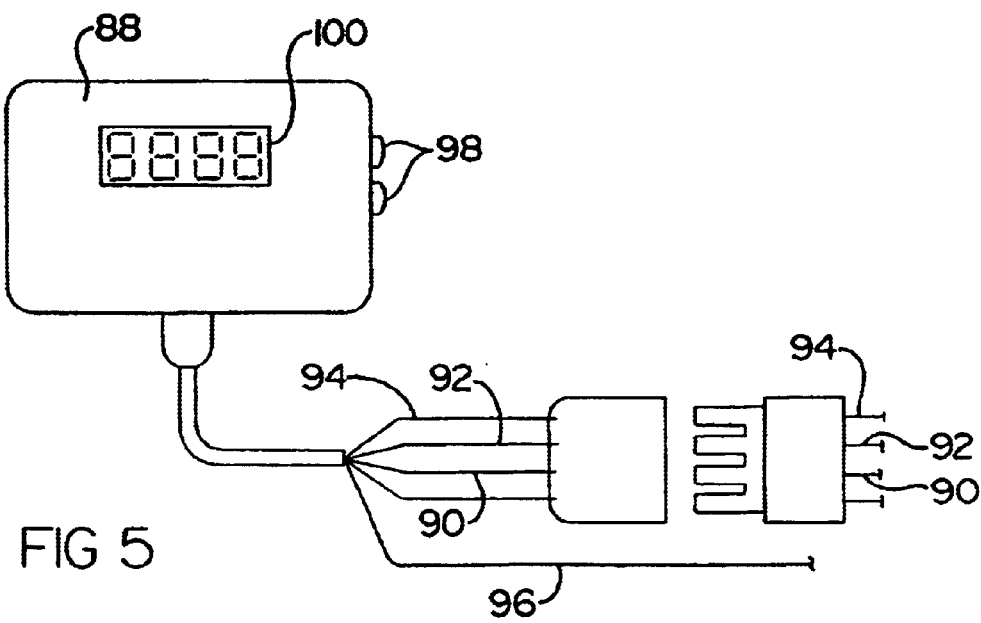
FIG. 5 is a schematic view of a controller for the control system of the reversing automatic feed wheel assembly of FIG. 1.

Referring to FIG. 5, the control system 55 includes a controller 88 connected by wiring 90 to a source of power such as a twelve-volt battery (not shown). The controller 88 is also connected by wiring 92 to an electrical ground such as the frame 22. The controller 88 is connected by wiring 94 to an overload sensing device such as an alternator (not shown) of the engine 20, a sensor (not shown) to sense rpm of the engine 20, or a magnetic pick-up (not shown) cooperating with the cutting assembly 18 to receive an input signal therefrom. The controller 88 is also connected by wiring 96 to a solenoid (not shown) of the reversing auto feed block 68. The controller 88 may include buttons 98 for inputting a time, which is displayed on a display 100 of the controller 88, to reverse the feed wheels 36. It should be appreciated that the overload sensing device can be electronic and/or hydraulic activated to control the mechanical/ hydraulic feed system of the wood chipper 12. It should also be appreciated that the control system 55 may be used with a feed wheel assembly that is powered hydraulically, electronically, or pneumatically.

In operation of the wood chipper 12, the engine rotates the cutting assembly 18 and hydraulically rotates the feed wheels 36a and 36b of the reversing automatic feed wheel assembly 10. Wood is fed into the inlet 16 of the infeed assembly 14 by an operator and is contacted by the feed wheels 36a and 36b. The wood is fed by the feed wheels 36a and 36b to the cutting assembly 18. As the cutting assembly 18 rotates and contacts the wood, the wood is cut or chipped into wood chips, which move through the outlet of the cutting assembly 18 and are expelled out of the discharge chute 24.

If an excessive load is placed on the cutting assembly 18 by the wood material being fed to the cutting assembly 18, the controller 88 receives an input signal of reduced power from the alternator, reduced rpm from the engine 20, or reduced speed of the cutting assembly 18, the controller 88 will send a signal to the solenoid of the reversing auto feed block 68. The solenoid will reverse the flow path, causing fluid to be supplied through the return lines 78 and 84. This causes the motors 76 and 82 to stop, in turn, stopping the feed wheels 36 to prevent the engine 20 from stalling. When the fluid through the lines 78 and 84 reaches the motors 76 and 82, the motors 76 and 82 are rotated in the opposite or reverse direction, thus reversing the feed wheels 36. The wood material is then pulled away from the cutting assembly 18 by the feed wheels 36 for a predetermined time to allow the engine 20 to recover its speed and/or power. Once the engine 20 has regained its normal operating rpm/power, the controller 88 sends a signal to the solenoid of the reversing auto feed block 68. The solenoid will reactivate the normal flow path, causing fluid to be supplied through the supply lines 74 and 80. This causes the motors 76 and 82 to restart the feed wheels 36. When the fluid through the supply lines 74 and 80 reaches the motors 76 and 82, the motors 76 and 82 are rotated in the opposite or forward direction to feeding of the wood material to the cutting assembly 18.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A reversing automatic feed wheel assembly for a wood chipper comprising:
    an infeed assembly;
    a rotatable cutting assembly spaced from said infeed assembly;
    at least one feed wheel disposed between said infeed assembly and said cutting assembly to feed wood material to said cutting assembly; and
    a control system operatively connected to said at least one feed wheel including an electronic controller and an auto feed block, said electronic controller being connected to said auto feed block to actuate said auto feed block to automatically stop and reverse said at least one feed wheel in response to an input signal of a reduced speed or excessive load placed on said cutting assembly by the infeed of the wood material and to automatically restart said at least one feed wheel when the reduced speed or excessive load is terminated.

2. A reversing automatic feed wheel assembly as set forth in claim 1 wherein said control system includes at least one motor connected to said at least one feed wheel to rotate said at least one feed wheel.

3. A reversing automatic feed wheel assembly as set forth in claim 2 wherein said control system includes a supply line and a return line connected to said at least one motor.

4. A reversing automatic feed wheel assembly as set forth in claim 3 wherein said auto feed block is operatively connected to said supply line and said return line to control a direction of fluid flow through said supply line and said return line.

5. A reversing automatic feed wheel assembly as set forth in claim 2 wherein said control system includes a pump to pump fluid to said auto feed block.

6. A reversing automatic feed wheel assembly as set forth in claim 5 wherein said control system includes a storage tank connected to said pump for containing fluid to be supplied to said pump and to receive fluid from said auto feed block.

7. A reversing automatic feed wheel assembly as set forth in claim 5 wherein said control system includes a feed valve interconnecting said auto feed block and said at least one motor to feed fluid thereto.

8. A reversing automatic feed wheel assembly as set forth in claim 5 wherein said controller includes an input device for inputting a time period for reversing said at least one feed wheel.

9. A reversing automatic feed wheel assembly as set forth in claim 8 wherein said controller includes a display for displaying the time for reversing said at least one feed wheel.

10. A reversing automatic feed wheel assembly for a wood chipper comprising:
    an infeed assembly;
    a rotatable cutting assembly spaced from said infeed assembly;
    a first feed wheel and a movable second feed wheel movable relative to said first feed wheel first to feed wood material to said cutting assembly; and
    a control system operatively connected to said first feed wheel and said second feed wheel including an electronic controller and an auto feed block, said electronic controller being connected to said auto feed block to actuate said auto feed block to automatically stop and reverse said first feed wheel and said second feed wheel in response to an input signal of a reduced speed or excessive load placed on said cutting assembly by the infeed of the wood material and to automatically restart said first feed wheel and said second feed wheel when the reduced speed or excessive load is terminated.

11. A reversing automatic feed wheel assembly as set forth in claim 10, wherein said control system includes a first motor connected to said first feed wheel and a second motor connected to said second feed wheel.

12. A reversing automatic feed wheel assembly as set forth in claim 11 wherein said control system includes a first supply line and a first return line connected to said first motor and a second supply line and a second return line connected to said second motor.

13. A reversing automatic feed wheel assembly as set forth in claim 12 including a flow divider connected to said first supply line and said second supply line.

14. A reversing automatic feed wheel assembly as set forth in claim 13 wherein said control system includes a feed valve connected to said first return line and said second return line.

15. A reversing automatic feed wheel assembly as set forth in claim 14 including a third supply line interconnecting said feed valve and said flow divider.

16. A reversing automatic feed wheel assembly as set forth in claim 15 wherein said control system includes a fourth supply line connected to said feed valve, a third return line connected to said feed valve, said auto feed block connected to said fourth supply line and said third return line to control a direction of fluid flow through said fourth supply line and said third return line.

17. A reversing automatic feed wheel assembly as set forth in claim 16 wherein said control system includes a pump to pump fluid to said auto feed block.

18. A wood chipper comprising:
    an infeed assembly;
    a rotatable cutting assembly spaced from said infeed assembly;
    a first feed wheel and a movable second feed wheel movable relative to said first feed wheel to feed wood material to said cutting assembly; and
    a control system operatively connected to said first feed wheel and said second feed wheel including an electronic controller and an auto feed block, said electronic controller being connected to said auto feed block to actuate said auto feed block to automatically stop and reverse said first feed wheel and said second feed wheel in response to an input signal of a reduced speed or excessive load placed on said cutting assembly by the infeed of the wood material and to automatically restart said first feed wheel and said second feed wheel when the reduced speed or excessive load is terminated.

* * * * *